E. SUHR & C. WISE.
Fan.
No. 232,314.  Patented Sept. 14, 1880.
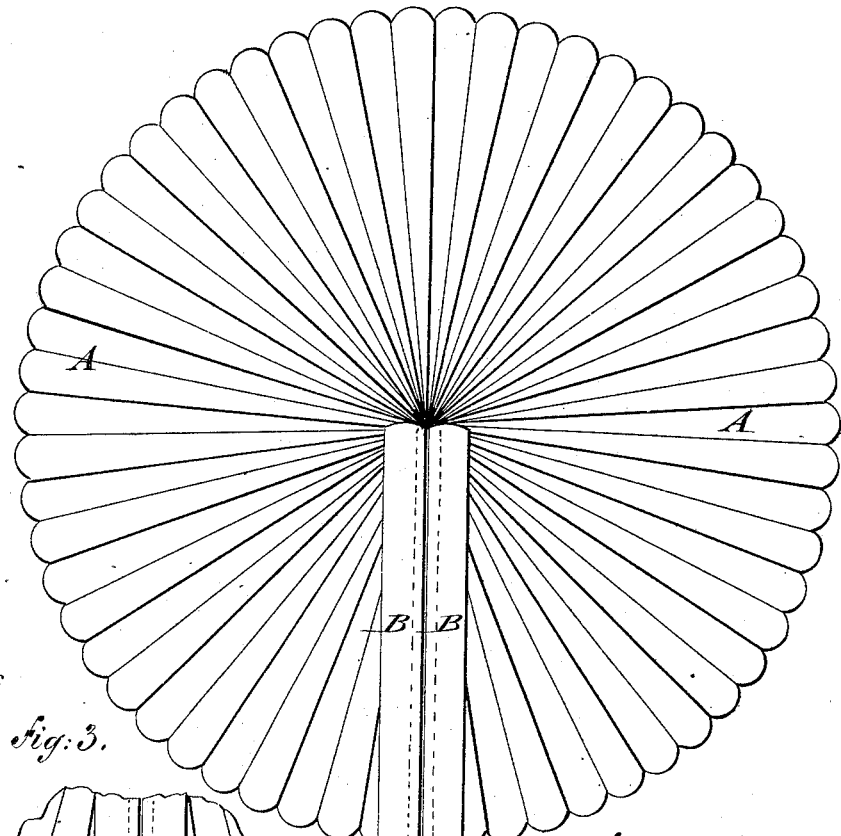
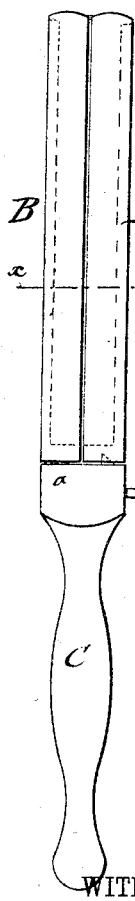
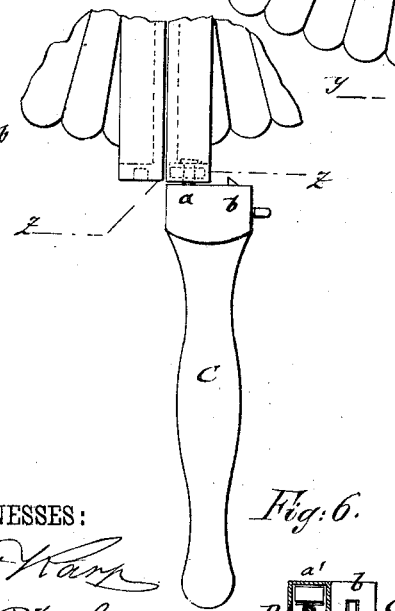
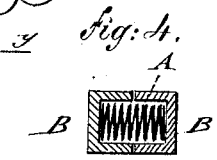
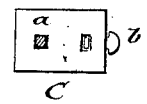
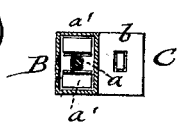
WITNESSES:
Carl Karp
Otto Risch
INVENTORS
Emil Suhr and
Colloman Wise
By Paul Goepel
ATTORNEY

UNITED STATES PATENT OFFICE.

EMIL SUHR, OF BROOKLYN, AND COLLOMAN WISE, OF NEW YORK, ASSIGNORS TO LOUIS SANDERS, OF NEW YORK, N. Y.

FAN.

SPECIFICATION forming part of Letters Patent No. 232,314, dated September 14, 1880.

Application filed January 20, 1880.

*To all whom it may concern:*

Be it known that we, EMIL SUHR, of the city of Brooklyn, county of Kings, and State of New York, and COLLOMAN WISE, of the city, county, and State of New York, have invented certain new and useful Improvements in Fans, of which the following is a specification.

In the accompanying drawings, Figure 1 represents a side elevation of our improved fan, shown partly in section and in position for use. Fig. 2 is a side view of the same closed. Fig. 3 is a side view of the fan shown in the act of being axially turned on the handle. Figs. 4 and 5 are horizontal sections of the same, respectively, on lines $x$ $x$, Fig. 2, and $y$ $y$, Fig. 1; and Fig. 6 is a horizontal section on line $z$ $z$, Fig. 3.

Similar letters of reference indicate corresponding parts.

This invention has reference to an improved fan which may be readily thrown into open or closed position; and it consists of a fan which is secured to longitudinally-recessed case-sections, which are hinged together at their upper ends, and which form an inclosing-case for the fan when brought face to face with each other. One case-section is swiveled to the fan-handle, while the other section is secured to the handle in open or closed position by a locking device of the same.

Referring to the drawings, A is a fan of any suitable size and material, the end plates of which are secured to longitudinally-recessed case-sections B B, which are open at their upper ends, but closed by solid portions at their lower ends adjoining the handle C.

The outer ends of the case-sections and the fan are connected by a hinge that allows one of the sections to be swung around the other section into such a position that the recessed portions are facing each other, as in Fig. 2, when a hollow case for the fan is formed, or in opposite directions until the rear walls of the sections are brought back to back, as shown in Fig. 1. In one case the fan is folded up within the case-sections. In the other case the fan is spread out into open position for use.

The lower end of one of the case-sections B is swiveled to a fixed pin, $a$, of the handle C, the swivel-pin being of square cross-section, and provided with an enlarged head, so as to retain the case-section.

At both sides of the swivel-pin are arranged small rubber blocks or spiral springs $a'$, within a box of the case-section, and faced by washers, as shown in Fig. 6, the rubber blocks serving to retain the case-section rigidly on the handle, whether facing with the recessed portion to one side or to the other, as the case may be.

The handle is enlarged at that part adjoining the case-sections, so as to be of the same cross-section as that of the case-sections together.

The swiveled case-section takes up one-half of the head of the handle, while the swinging case-section takes up the other half.

A spring-catch or other locking device, $b$, in the head of the handle engages a recess in the lower end of the swinging case-section and locks it rigidly to the handle, whether in open or closed position.

The fan is operated as follows: The swinging case-section is released from the handle and thrown over to the other side of the swiveled case-section, opening thereby the fan, as shown in Fig. 3. The swiveled section is then turned axially on the handle through an arc of one hundred and eighty degrees, so that the end of the swinging case-section is brought above the spring-catch of the handle and locked thereto. The fan is thus ready for use. For closing it the spring-catch is withdrawn, the swiveled case-section turned back through an arc of one hundred and eighty degrees, the swinging case swung home again until the fan is folded up between the case-sections, the lower part of the swinging section being then relocked by the spring-catch. The case-sections inclose the fan entirely, and admit, in connection with the swivel-pin and the locking device of the handle, the convenient opening and closing of the fan.

Having thus described our invention, we claim as new and desire to secure by Letters Patent—

1. The combination of the longitudinally-recessed case-sections B B and a fan, A, attached to the same, with a handle, C, to which one of the case-sections is swiveled, while the other is adapted to be locked thereto by a suitable fastening device, substantially as set forth.

2. In fans, the combination of a handle, C, having a fixed pin, $a$, with square shank in its head, with a case-section, B, which is swiveled to the pin and retained in line and flush with the head by rubber or other frictional springs arranged in recesses of the case-section at both sides of the square shank, substantially as set forth.

In testimony that we claim the foregoing as our invention we have signed our names, in presence of two witnesses, this 12th day of January, 1880.

EMIL STHR.
COLLOMAN WISE.

Witnesses:
F. STERNHEIMER,
H. A. SANDERS.